United States Patent Office 3,632,663
Patented Jan. 4, 1972

3,632,663
PRODUCTION OF HEXENES
John Grebbell, Send, near Woking, Kuldar Heljula, Twickenham, and David Eric Martin, Camberley, England, assignors to The British Petroleum Company Limited, London, England
No Drawing. Filed Apr. 16, 1968, Ser. No. 721,603
Claims priority, application Great Britain, Apr. 21, 1967, 18,396/67, 18,398/67; May 15, 1967, 22,321/67, Patent 1,163,092
Int. Cl. C07c 3/20
U.S. Cl. 260—683.15 E                    35 Claims

ABSTRACT OF THE DISCLOSURE

Hexenes are produced from a feedstock comprising ethylene, a n-butene and isobutene in the presence of a catalyst prepared by dispersing elemental sodium or lithium on an anhydrous potassium compound. The catalyst is activated by contacting with an olefin containing at least 3 carbon atoms per molecule or mixture of olefins. Subsequently the mixture of ethylene, a n-butene and i-butene is codimerised in contact with the activated catalyst. Where activation is effected by a mixture of olefins the mixture is different from the feedback to be codimerised.

---

This invention relates to a process for the production of hexenes.

Our British Pat. No. 962,255 and British Pat. No. 1,163,091 disclose a process for the production of hexenes which process comprises passing ethylene and a butene in contact with a catalyst consisting of or containing elemental lithium and/or sodium dispersed on an anhydrous potassium compound.

The main $C_6$ products obtained by the use of the butene isomers are as follows:

| Feedstock: | Product |
|---|---|
| Ethylene and n-butene-1 | 3-methylpentene-1 |
| Ethylene and n-butene-2 | 3-methylpentene-1 |
| Ethylene and isobutene | 2-methylpentene-1 |

The process of this invention is particularly suitable for the production of isoprene precursors, that is, hydrocarbons which can be demethanised, for example by pyrolysis, to form isoprene. The above products, 3-methylpentene-1 and 2-methylpentene-1 may be isomerised to yield isoprene precursors.

Butadiene raffinate is a commercially available feedstock which contains approximately 50% isobutenes, the remaining olefins consisting essentially of butene-1 and butene-2, with the latter usually predominating.

When such a mixed butene feedstock is reacted with ethylene, the hexene product is a mixture of isomers, 3-methylpentene-1 and 2-methylpentene-1 being the major constituents.

Use of a mixed feedstock introduces problems of initial reaction control since the optimum isobutene reaction temperature is different from that of the n-butenes. Direct complete activation of the catalyst is extremely difficult to achieve and in most cases leads to short catalyst life and low yields.

We have now discovered an indirect method of activation of the catalyst which results in increased product yields and reduced rates of catalyst decay.

Thus according to the present invention there is provided a process for the production of hexenes from a feedstock comprising ethylene, an n-butene and isobutene in the presence of a catalyst prepared by dispersing elemental sodium or lithium on an anhydrous potassium compound, which process comprises activating the catalyst by contacting the catalyst with an olefin containing at least 3 carbon atoms per molecule or mixture of olefins and subsequently codimerising ethylene, a n-butene and i-butene in contact with the activated catalyst, with the proviso that where activation is effected by a mixture of olefins the mixture is different from the feedstock to be codimerised.

Our British specification 1,066,113 claims a process for hydriding a catalyst comprising a dispersion of metallic sodium and/or lithium on an anhydrous potassium compound, which process comprises subjecting the catalyst before use, to treatment with hydrogen. Our British Pat. No. 1,143,993 claims the use of a catalyst prepared by dispersing the sodium and/or lithium on the potassium compound in the presence of hydrogen. Preferably such treatments are applied to a catalyst intended for activation in a process according to the present application. When this is done the activation period may suitably be reduced, for example in the third preferred embodiment below, to less than 4 days, preferably ½ to 2 days.

In a preferred embodiment of the process according to the invention the catalyst is activated by contacting with a mixture of olefins comprising a n-butene and/or isobutene in the absence of ethylene and then subsequently codimerising ethylene, a n-butene and isobutene in contact with the activated catalyst. In this embodiment the activation is conveniently effected at elevated temperature up to 250° C., preferably in the range 50–150° C. Activation is conveniently in the range 500–1500 p.s.i.g. Activation is generally completed within 15 days, usually within 2–10 days.

In an alternative preferred embodiment of the process according to the invention the catalyst is activated by contacting with a mixture of olefins comprising ethylene and an n-butene in the absence of isobutene and then subsequently codimerising ethylene, a n-butene and isobutene in contact with the activated catalyst. During this activation period a product consisting mainly of 3-methylpentene-1 is produced. In this embodiment activation is conveniently effected at a temperature in the range 50–200° C. preferably 60–85° C. Activation is conveniently effected at a pressure in the range atmospheric up to 4000 p.s.i.g. preferably in the range 100–1200 p.s.i.g. The activation period is generally from ½ to 7 days, preferably 2 to 4 days.

In a third preferred embodiment of the process according to the invention the catalyst is activated by contacting with propylene and then subsequently codimerising ethylene, a n-butene and isobutene in contact with the activated catalyst. In this embodiment activation is suitably effected at a temperature of up to 250° C., preferably 130–180° C. and under a pressure of up to 4000 p.s.i.g., preferably 800–2500 p.s.i.g. The activation period is generally up to eight days preferably from three to six days. During activation under the preferred conditions a product consisting mainly of 4-methylpentene-1 is produced.

Suitable potassium compounds for the catalyst are potassium hydroxide and potassium salts of mineral acids. Suitable potassium salts of mineral acids are the silicate, sulphate and halides; the preferred salt is potassium carbonate. The potassium compound may be in the form of powder, granules (chips of beads) or pellets.

The preferred catalyst is that comprising 1–20 percent by weight of metallic sodium dispersed on anhydrous potassium carbonate. The catalysts more preferably contain 0.5–10 percent by weight of sodium and most preferably 1–5 percent.

The catalyst according to the invention may be prepared by dispersing the sodium on the potassium compound in a number of ways including vapour deposition of the metal, deposition in a solution in liquid ammonia with subsequent evaporation of the ammonia, deposition of the metal from a heat decomposable compound such as sodium hydride (however, it is not essential that the compound decomposes completely because some decomposition occurs at the conditions of polymerisation), or preferably by stirring or tumbling the molten metal with the potassium compound in the presence of hydrogen as disclosed in our British Pat. No. 1,143,993 or an inert gas at temperatures in excess of the M.P. of sodium e.g. 150°–400° C., preferably 200–350° C., the potassium compound being selected such that it does not melt, sinter or decompose at the deposition temperature.

A temperature in the rangs 50°–200° C. is suitably employed for effecting the codimerisation of ethylene, the n-butene and isobutene. The preferred temperature range is 75°–115° C.

Usually the reaction pressure will be atmospheric or super-atmospheric, preferably up to 4000 p.s.i.g. Preferably the total reaction pressure will be in the range 100–1200 p.s.i.g.

Suitably the range of molar ratios of ethylene to total butenes will lie from 1:6 to 4:1, preferably from 1:4 to 2:1, most preferably in the range 1:3 to 1:1.

The process may be carried out either in the presence or absence of a solvent. Preferred solvents are hydrocarbons, for example, normally liquid paraffins; n-heptane is a particularly suitable solvent.

Preferably the feedstock will be free from dienes and acetylenes or will contain at most only a low total percentage content of these materials. Preferably the total content of dienes and acetylenes will be less than 1.0% by weight of the olefinic feedstock.

Our British patent specification No. 933,253 claims a process for polymerising an olefinic hydrocarbon which comprises contacting an olefinic hydrocarbon having at least 3 carbon atoms per molecule with a catalyst comprising an elemental alkali metal having an atomic number of less than 19 dispersed on an anhydrous potassium compound.

The invention is illustrated with reference to the following examples.

Example 1

Butenes and ethylene in a molar of 2:1 were passed at an LHSV of 1.0 v./v./h. over a catalyst containing 4.3% by weight of sodium on potassium carbonate powder at 1300 p.s.i.g.

The results in a series of runs with and without prior activation are given below.

Column 2 gives details of the activation stage of the process described in column 3, i.e. after 13 days on stream using an ethylene, butene-1 and butene-2 feed, isobutene was added.

|  | 2 | 3 | 4 | 5 | 6 |
|---|---|---|---|---|---|
|  | Prior activation | | | | |
|  | Yes | | No | | |
| Run number | 1 | 2 | 3 | [1]4 | |
| Butene feed, percent wt.: | | | | | |
| Butene-1 | 70 | 36 | | 19 | |
| Butene-2 | 30 | 16 | | 27 | |
| Isobutene | | 48 | | 54 | |
| Days on stream | 13 | 5 | 1 | 1 | 16 |
| Reaction temperature, ° C | 85 | 105 | 105 | 95 | 105 |
| Max. hexene yield, g/h/mole Na | 105 | 76.5 | 67 | 60 | 42 |
| Selectivity to hexenes, percent wt | 90 | 75 | 65 | 75 | 70 |
| Isoprene precursors in hexenes (3 MP1 and 2 MP1), percent wt | 92 | 95 | 96.5 | 96.5 | 95.5 |
| Catalyst decay rate, g/h/mole Na per day | ([2]) | ([3]) | ([4]) | ([5]) | ([6]) |

[1] Hydrogen pretreated catalyst 130–145° C./1,000 p.s.i.g./20 hours. In Runs 2 and 3 numerous exotherms occurred (up to 150° C.). This resulted in low selectivity to hexenes, that is, increased high polymer formation leading to short catalyst life. Run 4 shows clearly the decrease in decay rate owing to the hydrogen pretreatment but the low yield indicates that prior activation is still desirable.
[2] 1.5 over 13 days.   [3] 2.3 over 5 days.   [4] 6.2 in next 6 days.   [5] 5.0 in next 4 days.   [6] .25 over 16 days.

Example 2

Conditions as for Example 1 but using a refinery C₄ raffinate stream.

Butent analysis: (Percent wt.)
Isobutane _____ 1.3
n-butane _____ 8.9
Butene-1 _____ 25.5
Isobutent _____ 51.3
Butene-2
 (t) _____ 8.8
 (c) _____ 4.2
Butadiene removed to <5 p.p.m.

| Butene Feed | Butene-1 | Iso-butene | Butene-2 | Refinery C₄ raffinate | |
|---|---|---|---|---|---|
| Days on stream (cumulative) [1] | 7½ | 14½ | 20 | 23½ | 25½ |
| Reaction temperature, ° C | 85 | 125 | 85 | 115 | 102 |
| Max. hexene yield, g./h./mole Na | 110 | 56 | 125 | 81 | 72 |
| Selectivity to hexenes, percent wt | 93 | 69 | 95 | 87 | 86 |
| Hexene analysis, percent wt.: | | | | | |
| 3MP1 | 91.6 | 0.5 | 88.1 | 30.9 | 30.7 |
| 2MP1 | 0.3 | 93.2 | 2.0 | 62.8 | 63.2 |
| 3MP2 | 0.3 | | | 0.9 | 0.4 | 0.5 |
| 2MP2 | | 6.3 | | 1.8 | 1.3 |
| Hexene-2 | 7.8 | | 9.0 | 4.1 | 4.3 |
| Isoprene precursors in hexenes, percent wt | 92.2 | 100.0 | 91.0 | 95.9 | 95.7 |

[1] Butene-1 was codimerized with ethylene for 7½ days, then the flow of butene-1 was discontinued and isobutene substituted until a total of 14½ days on stream was reached, and so on.

Again the n-butene/ethylene activation is followed by satisfactory yield with the raffinate containing isobutene. Although no lifetime figures are available the high selectivity to hexenes (Columns 4 and 5) indicate low catalyst decay.

Example 3

Conditions as for Example 1 but with an LHSV of 2.0 v./v./h.

| Prior Activation | Yes | No |
|---|---|---|
| Reaction temperature, ° C | 110 | 105 |
| Hexene yield, g./h./mole Na | 145 | 48 |
| Selectivity to hexenes, percent weight | 74 | 70 |
| Hexene analysis, percent weight: | | |
| 3MP1 | 39.2 | 41.3 |
| 3MP2 | 0.1 | |
| 2MP1 | 55.5 | 54.5 |
| 2MP2 | 0.5 | 0.4 |
| Hexene-2 | 4.7 | 3.8 |
| Isoprene precursors in hexenes, percent weight | 95.3 | 96.2 |
| Catalyst decay rate, g./h./mole Na per day | ([1]) | 1.0 |

[1] Not determined.

Although the decay rate was low with no prior activation, the yield was very low. The use of the higher LHSV of 2.0 v./v./h., that is short butene/catalyst contact time, emphasises further the need for an activation period (of Examples 1 and 2 previously).

Example 4

A reactor was filled with a butene feed at 100° C. and 500 p.s.i.g. and maintained under these conditions for 66 hours. The reactor contained a catalyst containing 4.3% by weight of sodium on potassium carbonate powder. Butenes and ethylene in a molar ratio of 2:1 were the passed at a LHSV of 1.0 v./v./h. over the activated catalyst at 1300 p.s.i.g.

Experimental conditions and results are given in the table below. A comparative run in which the catalyst was not activated is also described.

| Activation | None | n-Butene/ isobutene as above |
|---|---|---|
| Butene feed, percent wt.: | | |
| Butene-1 | | 19 |
| Butene-2 (cis plus trans) | | 27 |
| Isobutene | | 54 |
| Days on stream | 1 | 13 |
| Reaction temperature, ° C | 95 | 95 |
| Max. hexene yield, g./h./mole Na | 60 | 60 |
| Selectivity to hexenes, percent wt | 75 | 70 |
| Isoprene precursors in hexenes, percent wt | 96.5 | 96.5 |
| Catalyst decay rate, g./h./mole Na per day | ¹ 5.0 | 1.5 |

¹ In next 4 days.

The system was considerably stabilized, as is shown by the better temperature control, good yield and catalyst life.

What is claimed is:

1. A process for the production of hexenes from a feedstock comprising ethylene, n-butene and isobutene in the presence of a catalyst prepared by dispersing elemental sodium or lithium on an anhydrous potassium compound, which process comprises activating the catalyst by contacting the catalyst for a minimum period of one-half day with an activating feed consisting essentially of members selected from the group consisting of propylene, an ethylene-free mixture of n-butenes and isobutene, an ethylene-free mixture of n-butenes, and an isobutene-free mixture of ethylene and n-butenes, and subsequent codimerizing said feedstock in contact with the activated catalyst.

2. A process according to claim 1 wherein the catalyst is subjected before use to treatment with hydrogen.

3. A process according to claim 1, wherein the catalyst is activated by contacting same with an ethylene-free mixture consisting essentially of n-butenes and isobutene.

4. A process according to claim 1, wherein the catalyst is activated by contacting same with an isobutene-free mixture consisting essentially of ethylene and n-butenes.

5. A process according to claim 1 wherein the catalyst is activated by contacting with propylene.

6. A process according to claim 3 wherein the activation is effected at an elevated temperature up to 250° C.

7. A process according to claim 6 wherein the activation is effected at a temperature in the range 50–150° C.

8. A process according to claim 3 wherein the activation is effected at a pressure in the range atmospheric up to 4,000 p.s.i.g.

9. A process according to claim 8 wherein the activation is effected at a pressure in the range 500–1,500 p.s.i.g.

10. A process according to claim 3 wherein the activation is effected for up to 15 days.

11. A process according to claim 10 wherein the activation is effected for 2–10 days.

12. A process according to claim 4 wherein the activation is effected at a temperature in the range of 50–200° C.

13. A process according to claim 12 wherein the activation is effected at 60–85° C.

14. A process according to claim 4 wherein the activation is effected at a pressure from atmospheric up to 4,000 p.s.i.g.

15. A process according to claim 14 wherein the activation is effected at a pressure in the range 100–1,200 p.s.i.g.

16. A process according to claim 4 wherein the activation is effected for ½ to 7 days.

17. A process according to claim 16 wherein the activation is effected for 2 to 4 days.

18. A process according to claim 5 wherein the activation is effected at a temperature up to 250° C.

19. A process according to claim 18 wherein the activation is effected at 130–180° C.

20. A process according to claim 19 wherein the activation is effected under a pressure of 800 to 2,500 p.s.i.g.

21. A process according to claim 1 wherein the potassium compound for the catalyst is potassium hydroxide or the potassium salt of a mineral acid.

22. A process according to claim 21 wherein the potassium salt of a mineral acid is the silicate, sulphate or a halide.

23. A process according to claim 21 wherein the potassium compound is potassium carbonate.

24. A process according to claim 21 wherein the catalyst contains between 1 and 20% by weight of sodium based on the weight of potassium compound.

25. A process according to claim 24 wherein the catalyst contains between 1 and 7% by weight of sodium.

26. A process according to claim 1 wherein the codimerisation of ethylene, n-butene and isobutene is effected at a temperature in the range 50–200° C.

27. A process according to claim 26 wherein the temperature is in the range 75–115° C.

28. A process according to claim 26 wherein the pressure is in the range atmospheric up to 4,000 p.s.i.g.

29. A process according to claim 28 wherein the reaction pressure is in the range of 100–1,200 p.s.i.g.

30. A process according to claim 1 in which the range of molar ratios of ethylene to total butenes lies from 1:6 to 4:1.

31. A process according to claim 30 in which the said range lies from 1:4 to 2:1.

32. A process according to claim 31 in which the said range lies from 1:3 to 1:1.

33. A process according to claim 1 in which the process is effected in the presence of a solvent comprising a normally liquid paraffin.

34. A process according to claim 32 in which the solvent is n-heptane.

35. A process according to claim 1 in which the total content of dienes and acetylenes is less than 1.0% by weight of the olefinic feedstock.

References Cited

UNITED STATES PATENTS 3,028,441  4/1962  Bush et al. _____ 260—683.15

FOREIGN PATENTS 962,255  7/1964  Great Britain __ 260—683.15 R

PAUL M. COUGHLAN, Jr., Primary Examiner

U.S. Cl. X.R.

252—476

UNITED STATES PATENT OFFICE
CERTIFICATE OF CORRECTION

Patent No. 3,632,663          Dated January 4, 1972

Inventor(s) Grebbell et al.

It is certified that error appears in the above-identified patent and that said Letters Patent are hereby corrected as shown below:

Column 1, line 25, "feedback" should be --feedstock--.

Column 3, line 15, "rangs" should be --range--.

Claim 34, "32" should be --33--.

Signed and sealed this 15th day of August 1972.

(SEAL)
Attest:

EDWARD M. FLETCHER, JR.          ROBERT GOTTSCHALK
Attesting Officer                Commissioner of Patents